(12) United States Patent
Purton

(10) Patent No.: US 10,271,679 B2
(45) Date of Patent: Apr. 30, 2019

(54) ESPRESSO MILK FROTHER

(71) Applicant: William Westmore Purton, Robe (AU)

(72) Inventor: William Westmore Purton, Robe (AU)

(73) Assignee: William Westmore Purton (AU)

( * ) Notice: Subject to any disclaimer, the term of this patent is extended or adjusted under 35 U.S.C. 154(b) by 83 days.

(21) Appl. No.: 14/783,574

(22) PCT Filed: Apr. 10, 2014

(86) PCT No.: PCT/AU2014/000384
§ 371 (c)(1),
(2) Date: Oct. 9, 2015

(87) PCT Pub. No.: WO2014/165911
PCT Pub. Date: Oct. 16, 2014

(65) Prior Publication Data
US 2016/0058238 A1 Mar. 3, 2016

(30) Foreign Application Priority Data

Apr. 10, 2013 (AU) .................. 2013901216

(51) Int. Cl.
*A47J 31/44* (2006.01)
*A23C 9/152* (2006.01)

(52) U.S. Cl.
CPC ......... *A47J 31/4489* (2013.01); *A23C 9/1524* (2013.01)

(58) Field of Classification Search
CPC ..................... A47J 31/4489; A23C 9/1524
See application file for complete search history.

(56) References Cited

U.S. PATENT DOCUMENTS 4,088,855 A * 5/1978 Emery .................. H01H 1/242
200/16 A
4,229,972 A * 10/1980 Phillips .................. G01F 23/24
338/264

(Continued)

FOREIGN PATENT DOCUMENTS

DE 10 2008 014 886 * 9/2009
IT 01236535 * 3/1993

(Continued)

OTHER PUBLICATIONS

Schmidt et al. "Characteristics of Food Contact Surface Materials: Stainless Steel" Food Protection Trends, vol. 32, No. 10, pp. 574-584 published Oct. 2012.*

(Continued)

*Primary Examiner* — Stephen Hobson
(74) *Attorney, Agent, or Firm* — The Belles Group, P.C.

(57) ABSTRACT

A milk frothing apparatus which includes a steam probe; a jug and jug support; a sensor to determine the depth of milk in a jug. The steam probe or jug support is movable preferably driven by stepper motor, to maintain the tip of the probe below the milk surface. A temperature sensor monitors the temperature of the milk in the jug. A micro controller is programmable to start the process; maintain the position of the steam probe relative to the milk surface, stop the process when the milk reaches a desired temperature and maintain records of the number of cycles and a measure of the quantity of milk treated. By using a sensor to measure the distance to the milk surface in a jug the tip of the steam probe can be maintained at the appropriate distance below the milk surface by moving the jug relative to the probe or preferably moving the probe. The process can be more precisely controlled by sensing the milk temperature and ensuring that the process is completed before the milk becomes too hot. The units may use steam generated in the (Continued)

espresso machine or use a designated steam boiler. The units may have multiple stations each with a jug and steam probe and associated temperature sensor. The stations may have the provision of a locking mechanism to prevent removal of the jug while the process is in progress.

7 Claims, 15 Drawing Sheets

(56) References Cited

U.S. PATENT DOCUMENTS

| | | | | |
|---|---|---|---|---|
| 5,498,757 | A * | 3/1996 | Johnson | A23C 9/1524 261/152 |
| 5,611,262 | A * | 3/1997 | Rizzuto | A47J 31/4485 99/290 |
| 5,694,115 | A * | 12/1997 | Desatoff | A47J 31/44 307/140 |
| 5,868,859 | A * | 2/1999 | Hei | B01D 19/04 134/18 |
| 6,183,800 | B1 * | 2/2001 | van Straten | A47J 31/4485 137/889 |
| 6,293,187 | B1 | 9/2001 | Zils | |
| 6,759,072 | B1 * | 7/2004 | Gutwein | A23F 5/243 426/429 |
| 6,901,848 | B2 * | 6/2005 | Beretta | A47J 31/4489 99/293 |
| 7,151,968 | B2 * | 12/2006 | Williamson | A47J 31/52 700/65 |
| 7,225,727 | B2 * | 6/2007 | Oldani | A47J 31/44 99/293 |
| 2009/0255415 | A1 * | 10/2009 | Cheng | A47J 43/07 99/453 |
| 2010/0047406 | A1 * | 2/2010 | Reyhanloo | A47J 31/4485 426/231 |
| 2010/0237517 | A1 * | 9/2010 | Stahl | A47J 31/4489 261/77 |
| 2010/0300301 | A1 * | 12/2010 | Cahen | A47J 31/4403 99/323.1 |
| 2012/0073449 | A1 | 3/2012 | Volonte et al. | |
| 2012/0156337 | A1 * | 6/2012 | Studor | A47J 31/44 426/231 |
| 2013/0115343 | A1 * | 5/2013 | Reyhanloo | A47J 31/4485 426/231 |
| 2014/0264972 | A1 | 9/2014 | Studor et al. | |
| 2015/0104548 | A1 | 4/2015 | Yip | |
| 2016/0000259 | A1 * | 1/2016 | Studor | B01F 3/04446 99/323.1 |

FOREIGN PATENT DOCUMENTS

| | | | |
|---|---|---|---|
| WO | 2010121299 | 10/2010 | |
| WO | 2011070365 | 6/2011 | |
| WO | WO 2011/140667 | * 11/2011 | |
| WO | WO 2011140667 A1 * 11/2011 | | A47J 31/4485 |

OTHER PUBLICATIONS

Google translation of Elia IT 01236535 published Mar. 11, 1993.*
EPO translation of Jaskolka DE 10 2008 014 886 A1 published Sep. 24, 2009.*
Corresponding Written Opinion of the International Searching Authority for PCT/AU2014/000384 dated Oct. 21, 2014. WO.
Corresponding International Preliminary Report on Patentability for PCT/AU2014/000384, dated Sep. 22, 2015.

* cited by examiner

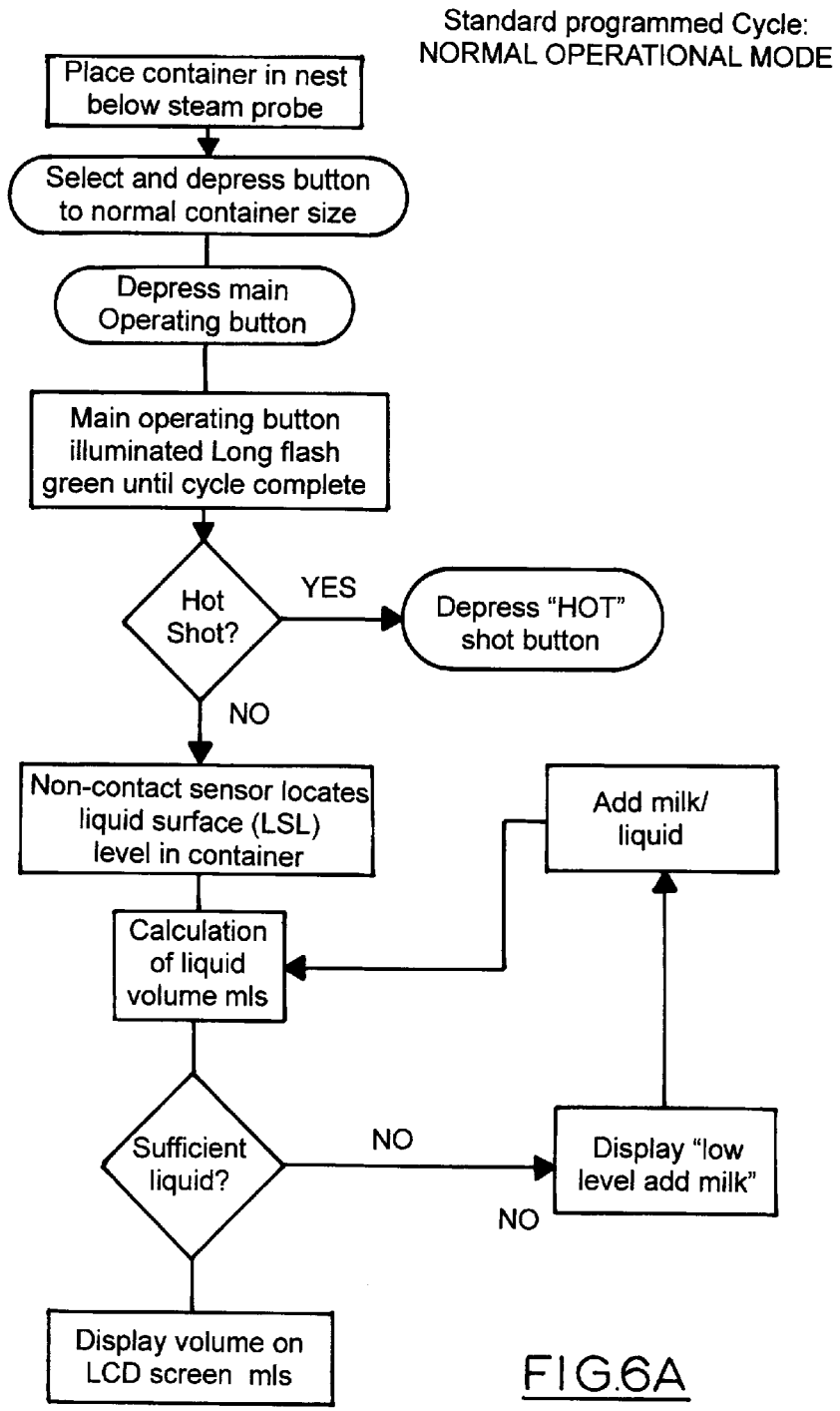

ESPRESSO MILK FROTHER

PRIORITY

Priority is claimed as a national stage application, under 35 U.S.C. § 371, to international patent application No. PCT/AU2014/000384, filed Apr. 10, 2014, which claims priority to Australian patent application 2013901216, filed Apr. 10, 2013. The disclosures of the aforementioned priority applications are incorporated herein by reference in their entirety.

BACKGROUND TO THE INVENTION

There is a World-wide trend in both developed and developing countries for increasing coffee consumption. The European styles of serving coffee with milk are by far the most popular—in particular, caffe latte, cappuccino and flat white coffee It is more time-consuming to produce the European styles of coffee as the milk has to be heated with the infusion of steam to create a frothiness or foam which is an essential component for the overall taste, mouth-feel and appearance of the coffee style.

U.S. Pat. No. 4,800,805 discloses a typical espresso machine with a steam probe that may be telescoped and also includes air intake to mix air and steam into the milk. Because the current manual process of steaming the milk is operator-dependent, there can be a wide variation of temperature, taste and appearance of the coffee style.

To save time and reduce dependence on a barista, machines with automatic milk frothers have been proposed U.S. Pat. No. 5,611,262 discloses a dispenser for frothed milk. The milk is frothed by mixing with air and avoids the need for a barista to use steam.

U.S. Pat. No. 6,183,800 (Sarah Lee) similarly addresses the problem of avoiding the time taken by a barista by using a frother in the machine to dispense frothed milk. These proposals are not acceptable for restaurant standard coffee.

U.S. Pat. No. 6,901,848 proposes an automatic milk frother that senses the temperature of the milk and has a controller that enables combinations of steam and air to be provided for predetermined periods of time to produce varying frother results. The barista simply holds the milk jug in place until the pre-set cycle is finished. This proposal does not reduce the baristas work load or improve the barista's productivity.

It is an object of this invention to ameliorate the shortcomings of the prior art and provide means to make high quality espresso milk while improving the Barista's productivity.

BRIEF DESCRIPTION OF THE INVENTION

To this end the present invention provides a milk frother that includes:
 a steam probe
 a jug and jug support
 a sensor to determine the depth of milk in a jug;
 the steam probe or jug support being movable preferably driven by stepper motor, to maintain the tip of the probe below the milk surface;
 a temperature sensor to monitor the temperature of the milk in the jug;
 a micro controller which starts the process; maintains the position of the steam probe relative to the milk surface; stops the process when the milk reaches a desired temperature and maintains records of the number of cycles and a measure of the quantity of milk treated.

By using a sensor to measure the distance to the milk surface in a jug, the tip of the steam probe can be maintained at the appropriate distance below the milk surface by moving the jug relative to the probe or preferably moving the probe. The process can be more precisely controlled by sensing the milk temperature and ensuring that the process is completed before the milk becomes too hot. The units may use steam generated in the espresso machine or use a designated steam boiler. The units may have multiple stations each with a jug and steam probe and associated temperature sensor. The stations may have the provision of a locking mechanism to prevent removal of the jug while the process is in progress.

During the operating cycle, the depth sensor (either a solid probe or non-contact type sensor using IR or Ultrasound technology) monitors the surface of the liquid as the surface/froth rises in the jug, the steam wand is automatically elevated to maintain the same depth/relationship of the probe tip in the liquid. Ultrasound is preferred because it is able to detect the phase change surface at the milk/foam interface or the foam/air interface. An alternate sensor is to electrically isolate the steam probe and use the stainless steel probe as a resistive sensor to measure the liquid level in the jug.

Constant feed-back is also received from the two temperature sensors and, as the desired temperature of the liquid is reached, the steam valve is closed and the steam wand is withdrawn from the liquid—returning to the starting position.

The jug, which is captive until the cycle is complete, is released using mechanically operated lugs or pins and remains sitting in the location nest, until the operator removes it for use. A heating element may be incorporated into the jug support base to maintain the temperature of the milk for limited periods after the frothing/heating process is complete.

The unit may comprise a single be a stand-alone milk frother with its own steam generator and have one or more stations each with its separate steam probe, sensors and independently operated mechanisms to manage the movement of the steam probe and jug relative to each other. The jugs may be of different sizes and may contain different types of milk such as skim, full cream or soy milk. Alternatively the unit may be arranged to stand beside an espresso machine and be connected to the steam out let of the espresso machine.

The prior art milk frothers have common elements which do not achieve the same quality and consistency of coffee made by an experienced and competent barista, although they do save time and allow for the operation of "self service" machines.

The purpose of this invention is to automate the production of consistently heated and frothed milk (including animal milk and milk derived from plants such as soy, rice, other grains and nuts) using an electro-mechanical device to mimic the process normally carried out by the barista.

By exactly monitoring the temperature, steam pressure and position of the steam wand tip in the milk/liquid and being able to change any or all of these variables during the process, according to the type of milk being used, create the best possible and most consistent heated/frothed milk product possible with which to make the perfect cup of European style coffee.

It is envisaged that a barista will be assisted with one or more of these devices, particularly during busy operational periods. Also lesser-skilled baristas will be able to produce more consistent coffee and at a faster rate than using manual techniques alone.

Whilst the barista is pouring milk into cups and glasses (which may already contain the espresso coffee), the frother of this invention may be simultaneously heating and frothing the next jug or container of milk. The greater output of heated and frothed milk will allow the barista to produce coffee as fast as the espresso coffee machine is able to be loaded with fresh ground coffee by the barista and espressed. Productivity will be increased and substantial labour costs will be saved.

DETAILED DESCRIPTION OF THE INVENTION

Preferred embodiments of the invention will now be described with reference to the drawings in which FIG. 1 is a front view of the steaming unit of this invention with the steam probe retracted;

Figure 5:
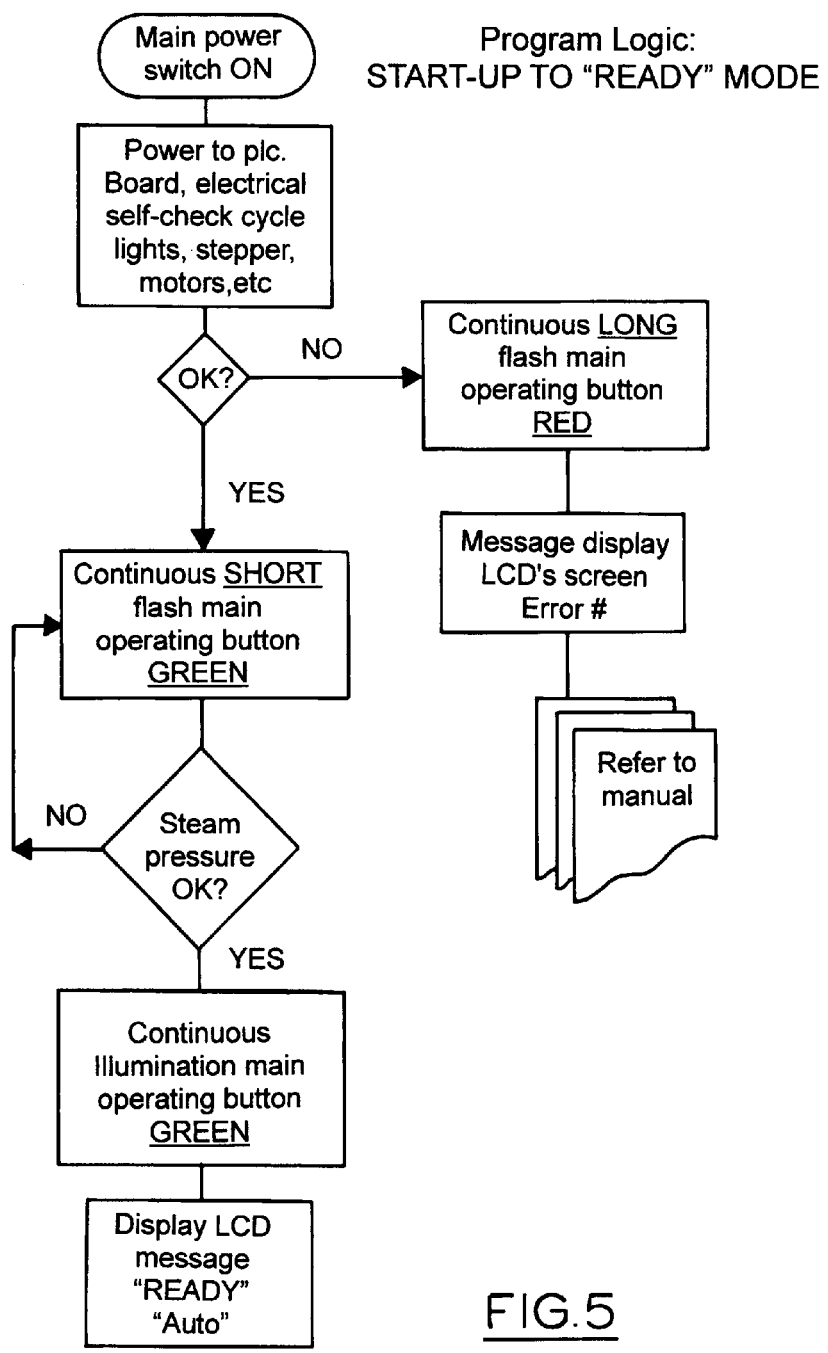
Figure 6B:
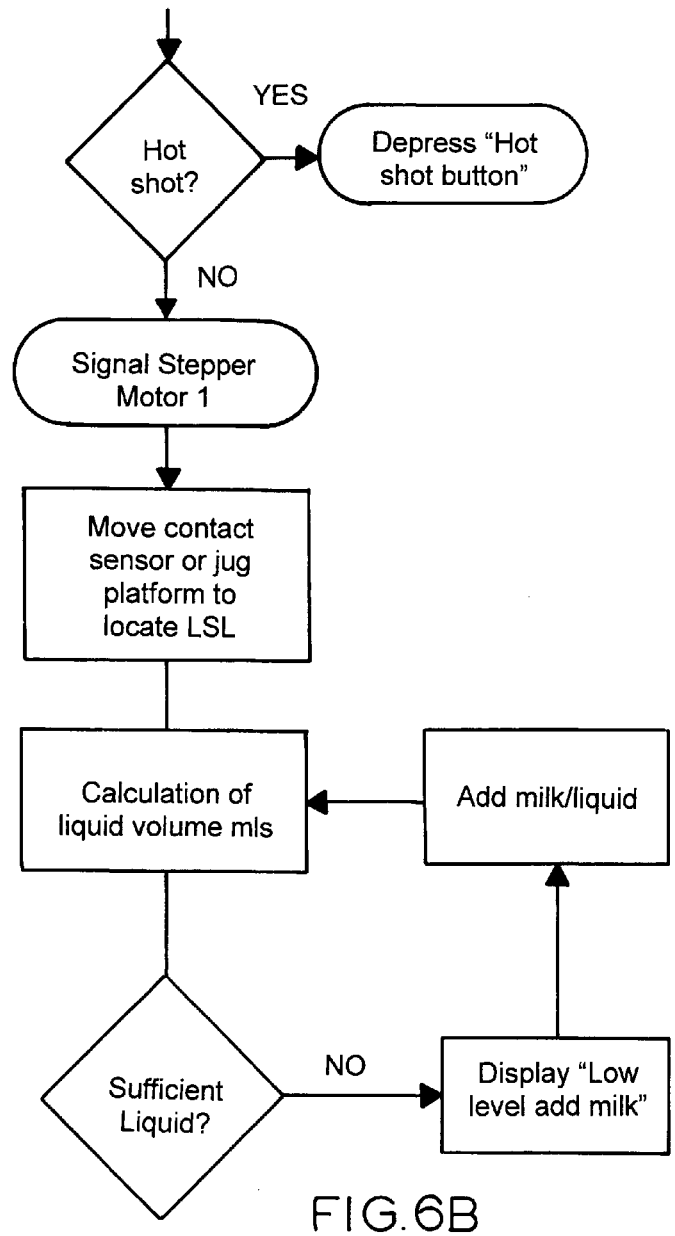
Figure 7A:
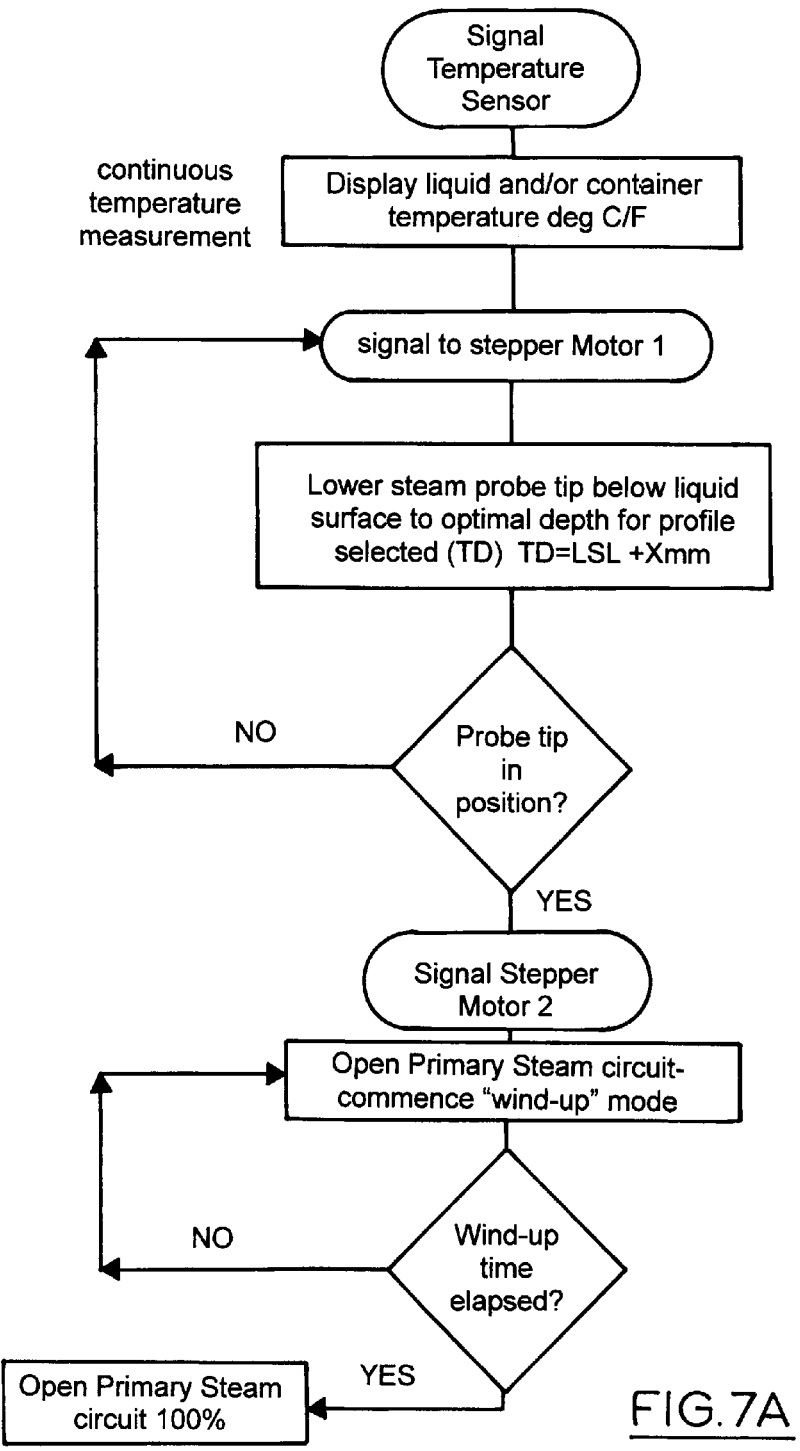
Figure 7B:
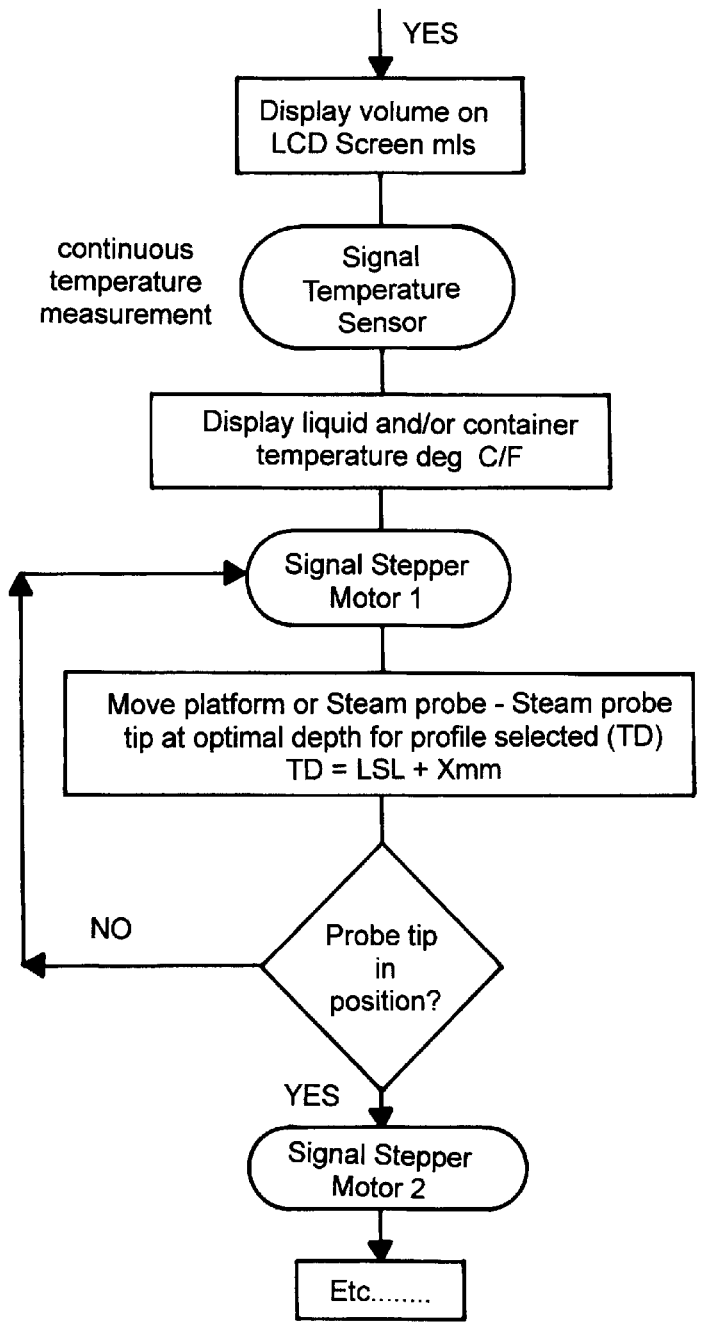
Figure 10:
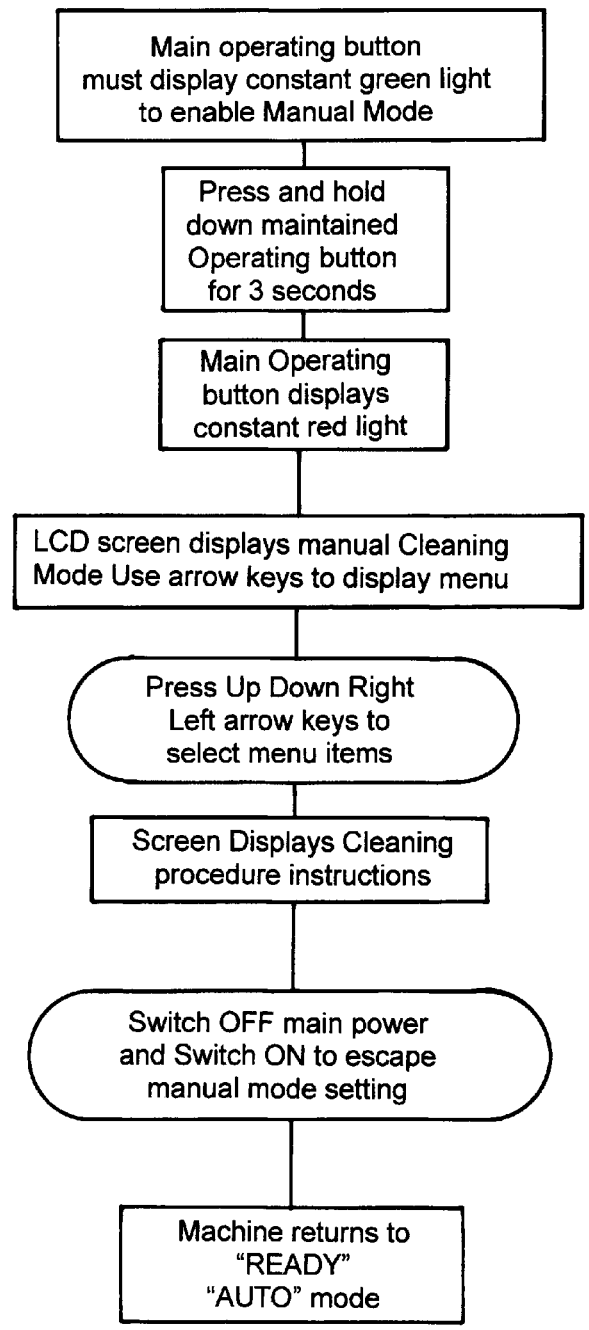

FIG. 5 to 11 sets out the flow chart for the controller programs in which FIG. 5 lays out the machine ready logic;

FIG. 6 to 9 illustrates the flow chart for the standard operating cycle;

FIG. 10 illustrates the flow chart for the manual mode; and

Figure 11:
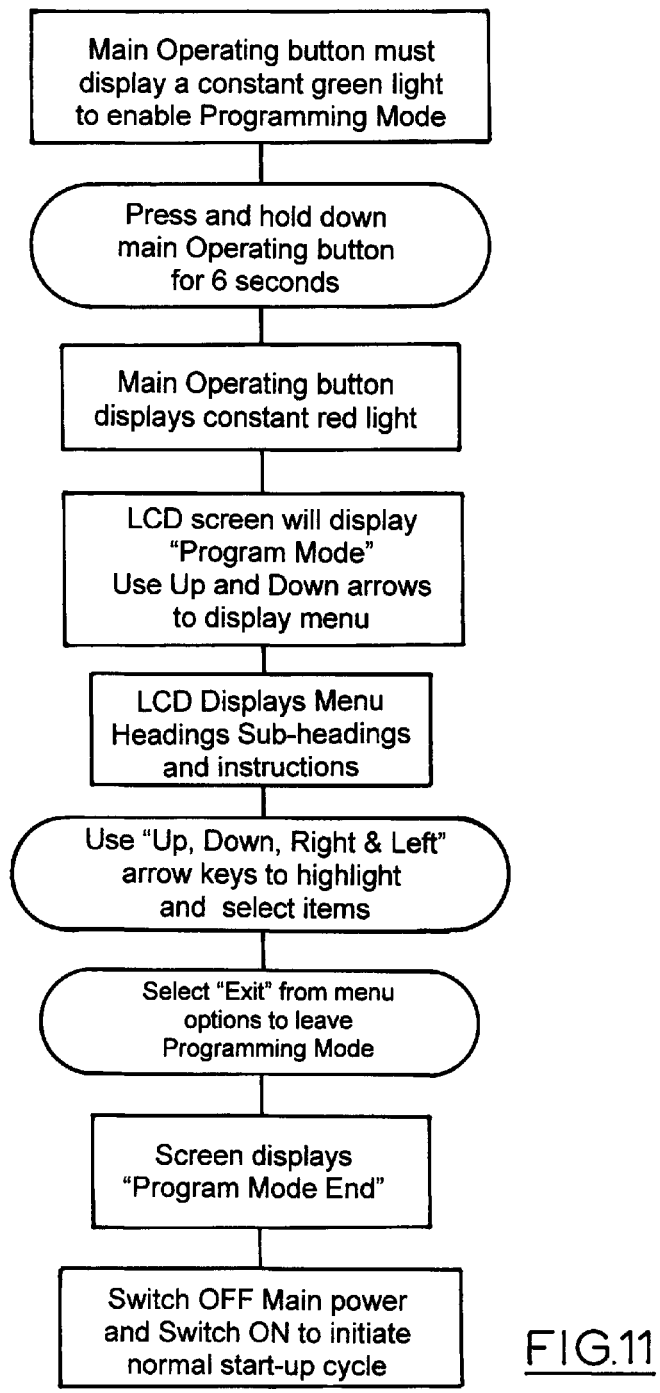

FIG. 11 outlines the steps for setting up the operational parameters of the controller.

For baristas the frothing of milk is an art and there are many variables to contend with namely milk composition, steam temperature, entrainment of air, and position of the steam probe tip.

Entrapped heated air expands in the upper layers of the milk causing bubbles (creating froth) to expand in diameter. Steam passed through the milk (i) raises the temperature and begins to cause dissolved gasses (air) to come out of solution The, initially, microscopic bubbles begin expanding and congregate in strata, eventually rising/settling in the top or upper portion of the heated liquid One or more steam jets originating from the steam nozzle are usually directed downwards or at an oblique angle to the plane of the milk surface. This can be achieved by the tip of the steam wand having one or more perforations directing steam in a radiating fashion from the tip.

In the jug the frothed milk will contain 3 strata namely Low (liquid milk) Mid (milk containing small bubbles) High (large bubbles/froth)

Each steam jet creates its own vortex, the energy of which is eventually absorbed by the milk, agitating the milk as well as raising its temperature.

The texture of the heated milk or mouth-feel is also an important factor which is developed by the application of heat—especially direct heating using steam.

The interface temperatures between steam and surrounding milk are typically 130 C and cause the milk fats to melt and disperse into the now polymorphous mixture. Milk sugars in the form of lactose (glucose and galactose) are also affected by the heating process.

At the interface between steam and suspended milk fat particles microscopic amounts are vaporised, causing the milk to display a silky texture. The optimum effect is discernible in milk from the mid stratum where small bubbles predominate. Too much heat will destroy the structure of the milk sugars leading to their caramelization and the resultant over-heated milk will mask the flavour and presence of the majority of natural coffee essences. The milk will effectively undergo a phase separation, lose frothiness and, apart from scalding the mouth of the drinker, it will cause the coffee to become tasteless to the palate. The frothing program can accurately control the parameters of steam volume, time and temperature to achieve different results. Heated and frothed milk profiles are varied according to the style of coffee drink.

The frothing program can control the parameters of steam volume, time and temperature to achieve different results.

Flat white coffee: uses the densest milk with little aeration at the bottom of the container CaffeLatte: is achieved by keeping the tip of steam wand in contact with the densest lower layer for longer periods of time (ie move probe up vertically more slowly as milk nears the desired final temperature.

Cappuccino: is achieved by keeping tip further away from the dense lower layer and moving or withdrawing wand slightly more rapidly as the milk nears the desired temperature.

Jug Design:

3 sizes may be offered small, medium and large

Large being approximately 12-13 cms tall with a base diameter of approx. 11-12 cms and tapering to an open top with integrated spout/pouring lip of approx. 9-10 cms in diameter.

Latte jugs ideally require a slightly narrower and longer pouring lip than is usual for pouring cappuccinos and flat-white coffees. The narrower spout gives the barista greater control on the way the milk is poured.

Nest Design

The preferred embodiment of the nest design comprises three or more rigid, concentric rings which are stepped to locate the jug centrally so that the steam probe, sensors and jug are always in the same relative position. The rigid nest design which is removable for the purposes of easy cleaning, can be fixed into the base of the machine or incorporated into the moving platform for machines which embody the design using a fixed steam probe. The fixed steam probe is completely accessible for manual cleaning purposes and does not necessitate a secondary steam circuit. The machine operator is required to nominate the jug size manually by pressing a button on the control panel which corresponds to each calibrated jug size.

Figure 2:
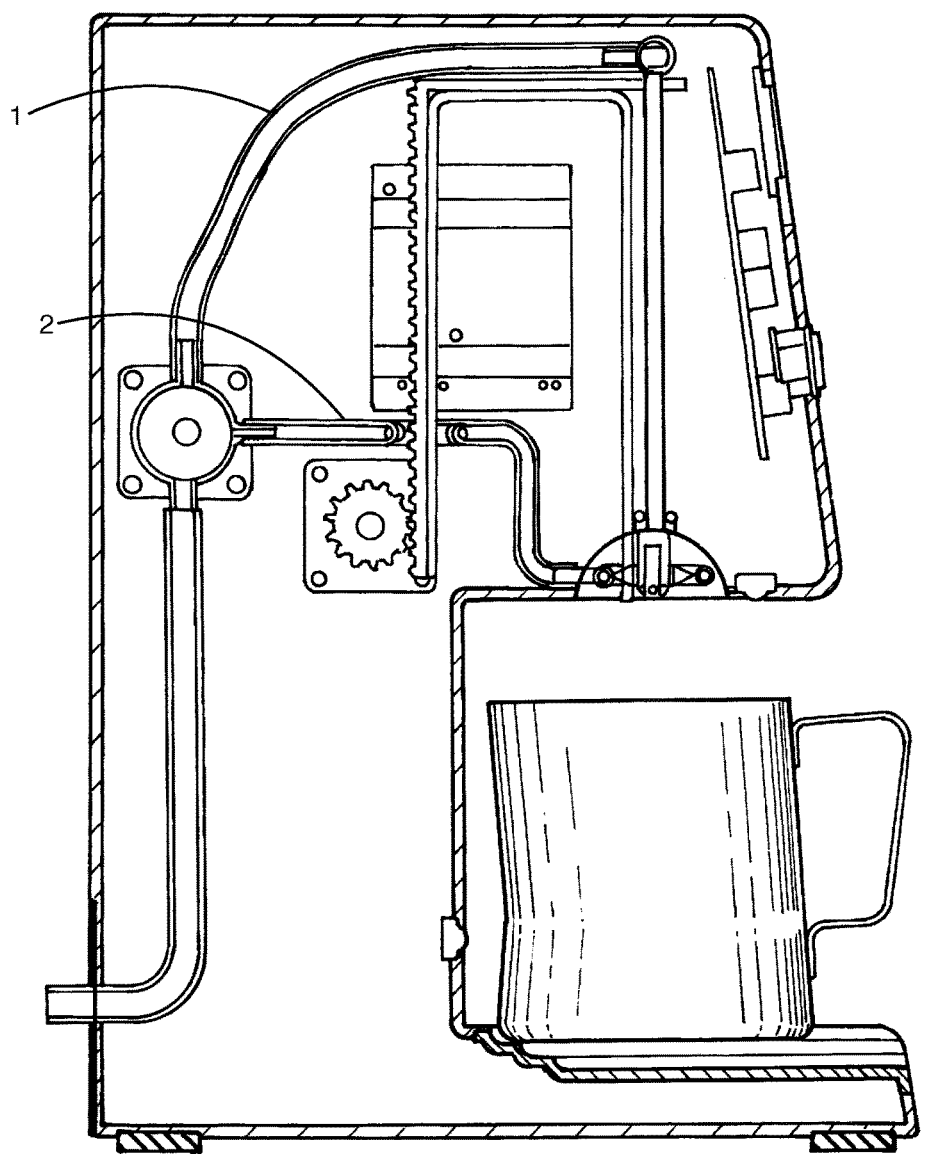
FIG. 2 illustrates a cross section along A-A of FIG. 1

In another embodiment, the jug is placed on a spring-loaded nest comprising 3 concentric stainless steel rings as illustrated in FIG. 2. The inner diameter is approximately 6-8 cms; the middle ring is 8-9 cms and the outer diameter 9-12 cms approximately. These diameters equate to the jug diameter sizes listed above. Placing the smallest jug on the nest of rings causes the centre ring to drop slightly (say 0.5-1 cm) causing a sensor located under the ring to send a signal to the central PLC, indicating the size of the jug being used. The machine's depth sensor locates the liquid level then determines and displays the volume of milk in the jug which will have been previously calibrated. This same process applies to all jugs used with the machine of this invention.

The nest may also include a locking mechanism that retains the jug in position during the cycle. This may be activated when the process button is pressed or when the probe commences its descent and is deactivated when the process cycle is complete and the probe has been retracted.

The concentric rings forming the jug nest are interconnected using 3 bayonet pins on each of their external circumferences.

The whole unit is preferably designed so that it lifts out for easy cleaning.

Figure 1:
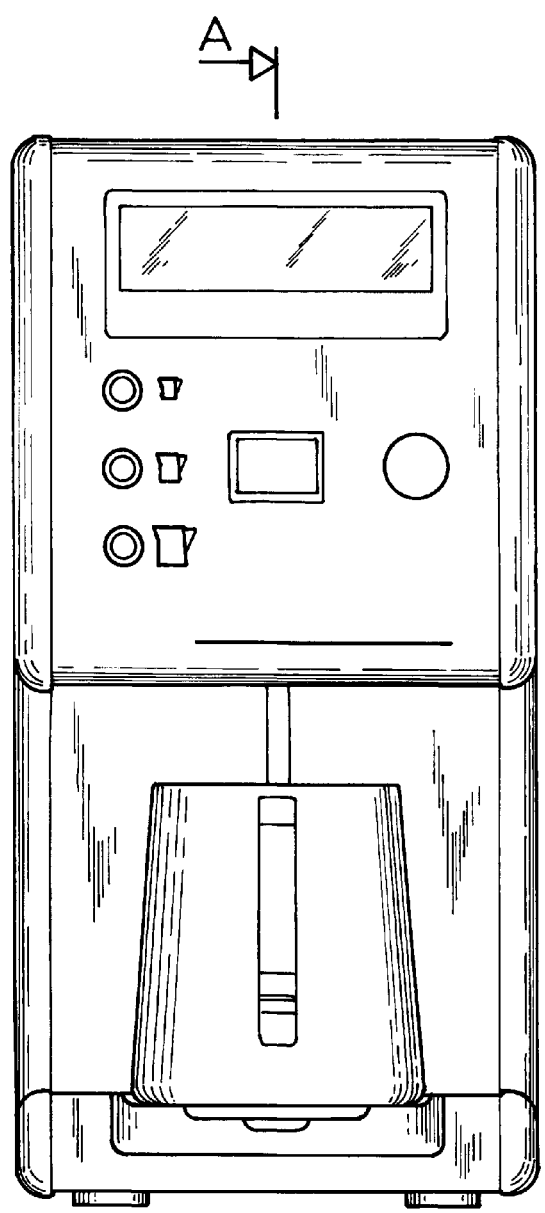
Figure 3:
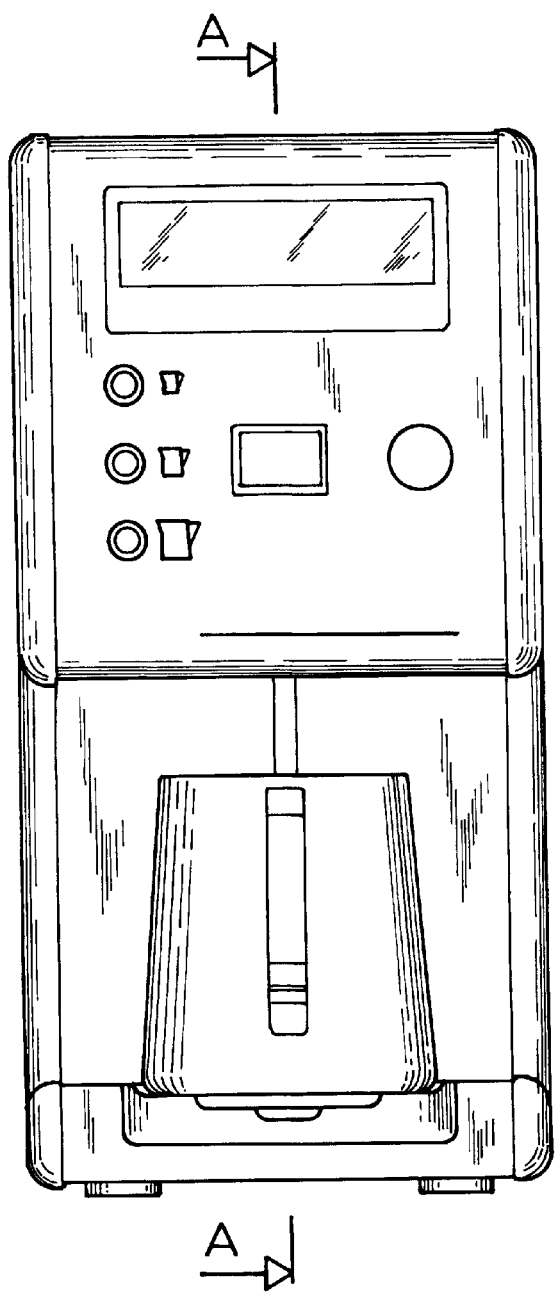
FIG. 3 is a front view of the steaming unit of this invention with the steam probe extended.

Referring to FIGS. 1 and 3, the maximum path of vertical travel for the probe will be about 15 cm.

Figure 4:
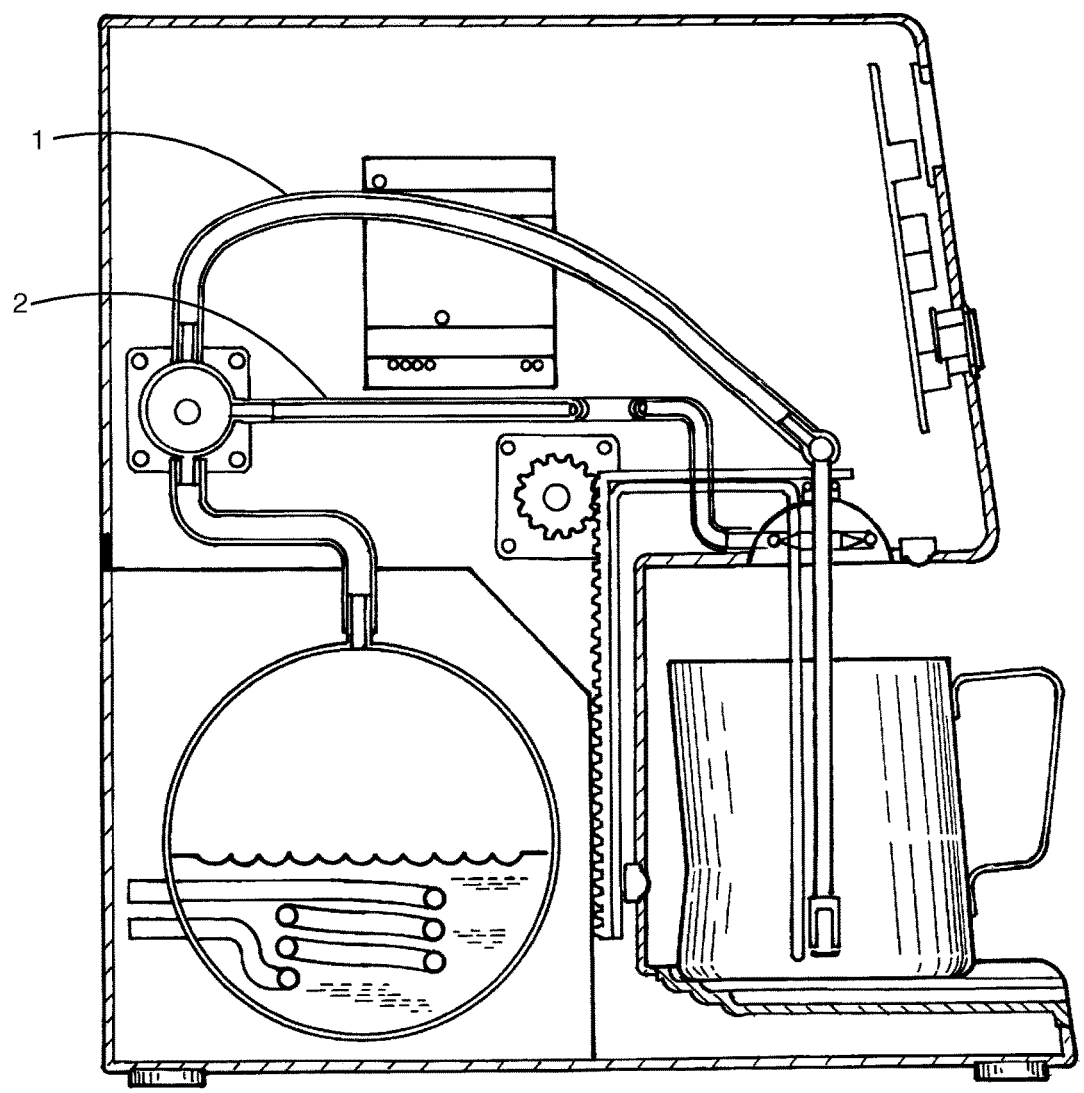
FIG. 4 illustrates a cross section along A-A of FIG. 1.

The drive mechanism schematically shown in FIG. 4 may use a stepper motor that can control the distance of travel of the probe into the jug. In an alternative embodiment the probe is fixed and the jug nest is raised using a similar stepper motor located in the base of the machine.

Any conventional gearing arrangement may be used.

The probe or nest is moved using a data received by the controller from a depth probe using electrical resistance principles. The assumption being that the denser the liquid, the lower the resistance. Calibration of the probe may use the initial cold milk fill. The probe tip is maintained in the M-L strata throughout the heating and frothing process. Depth control is preferably by incremental using an electronic feed-back loop with PLC and stepper motor. Alternatively the separate probe may be omitted and by electrically isolating the stainless steel steam probe the probe itself may be used as a resistive sensor.

In another embodiment which allows for the construction of a machine with a lower physical profile, the rigid steam probe is replaced with suitable flexible tubing which is wound around a rotating reel.

The flexible probe is attached at one end to the hollow shaft of the reel which may then be rotated in either direction. The flexible probe is captured and guided by a series of pulleys which are directly opposed to one another. Off-setting particular pulleys allows the flexible probe to be oriented into a vertical position above the jug. Rotating the reel using a stepper motor advances or retracts the flexible probe according to the PLC and stepper motor feedback.

Steam is passed from the generator through the rotating shaft and exits the probe tip in the usual way.

Instead of an electric stepper motor a pneumatic drive may be used. A full revolution of a 4.5 cm reel will move probe tip 14 cm; 270 deg revolution of reel for a 6 cm diameter reel or 180 deg revolution for a 9 cm reel will achieve the same range of movement. This reel embodiment may be preferred where the height of the machine needs to be minimised.

The steam probe may be made of stainless steel or flexible tubing of Teflon, polycarbonate or other heat resistant polymeric materials.

By adjustment of the steam probe tip both up and down during the frothing process, the size/depth of each strata or phase in the jug can be precisely controlled using a probe which measures electrical resistance of the various phases. The depth probe which may be set at an initial relative position to the steam wand tip both in terms of lateral positioning and vertical positioning in the liquid/milk container and preferably moves with the steam probe tip.

Non-contact phase location may also be used using infra red (IR) or ultrasound sensors. These sensors may be located adjacent the steam probe above the centre of the jug. Ultrasound sensors may also be located below the jug.

The machine may be designed as a stand-alone unit supplied with its own power and integral steam generating source/capability. Alternately it may be supplied with its own power source to operate stepper motors, PLC unit etc but obtain steam from an adjacent steam generating source (eg coffee machine) either by a direct connection to the coffee machine's own boiler or connected to the coffee machine's existing steam outlet.

The unit of this invention also lends itself to be incorporated in the design of future coffee machines as a standard feature, or an optional superior model feature.

The controller may include settings for desired milk temperatures with single-cycle over-ride button for those customers who want substantially hotter coffee than is typically served.

A rectangular LCD screen may be used in conjunction with a key pad. The controls and screen are preferably arrayed on the fascia panel above the jug supports. Immediately below the screen a large rectangular illuminated red/green button may be used as the main operating button.

To the right of the main operating button a round, red "hot" button may be provided which when depressed, causes the PLC to commence a single higher milk temp cycle immediately the green button is pressed. After this single cycle, the machine will revert to its normal programmed temperature parameters.

FIG. 5 illustrates the logic of the start up program indicates the automatic start up routine that checks that all components are operational and that steam pressure is at an operational level and displays on the screen that the machine is ready.

LCD Screen and Programming Modes
1 Programme
Main menu
date
time
cycles/data log for monitoring usage and maintenance requirements
temperature (i) target+/−deg C. change or set
  Milk temp & external jug temperature
  (ii) "hot shot" temperature setting target deg C.
Steam values
Max pressure Min pressure limits Bar
Steam pressure Ramp up Time secs
Steam pressure Wind down Time secs Above and below set parameters machine will cease to operate until all within set tolerances.

Figure 8A:
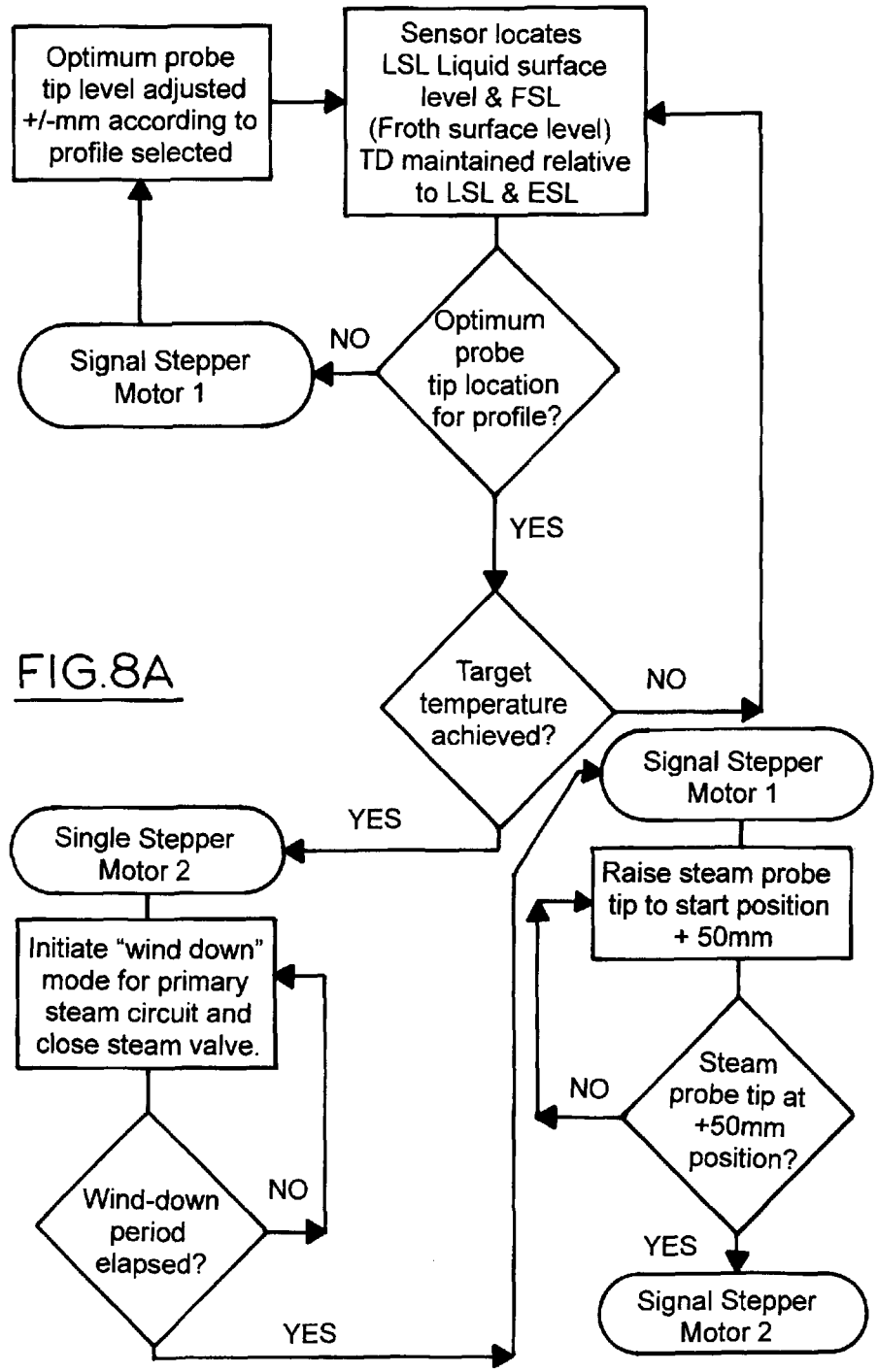
Figure 8B:
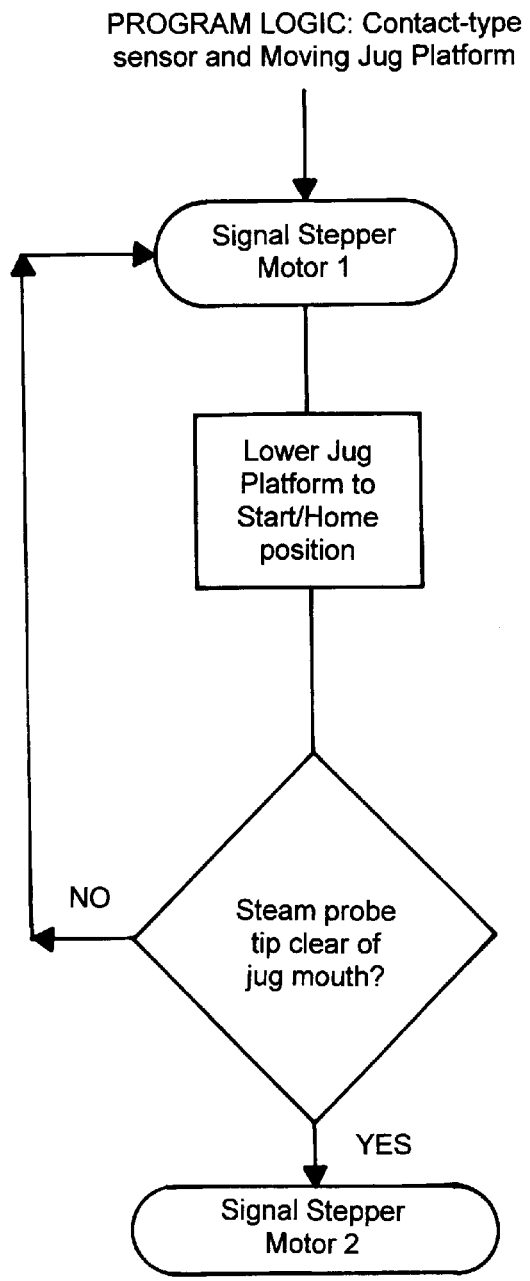
Figure 9A:
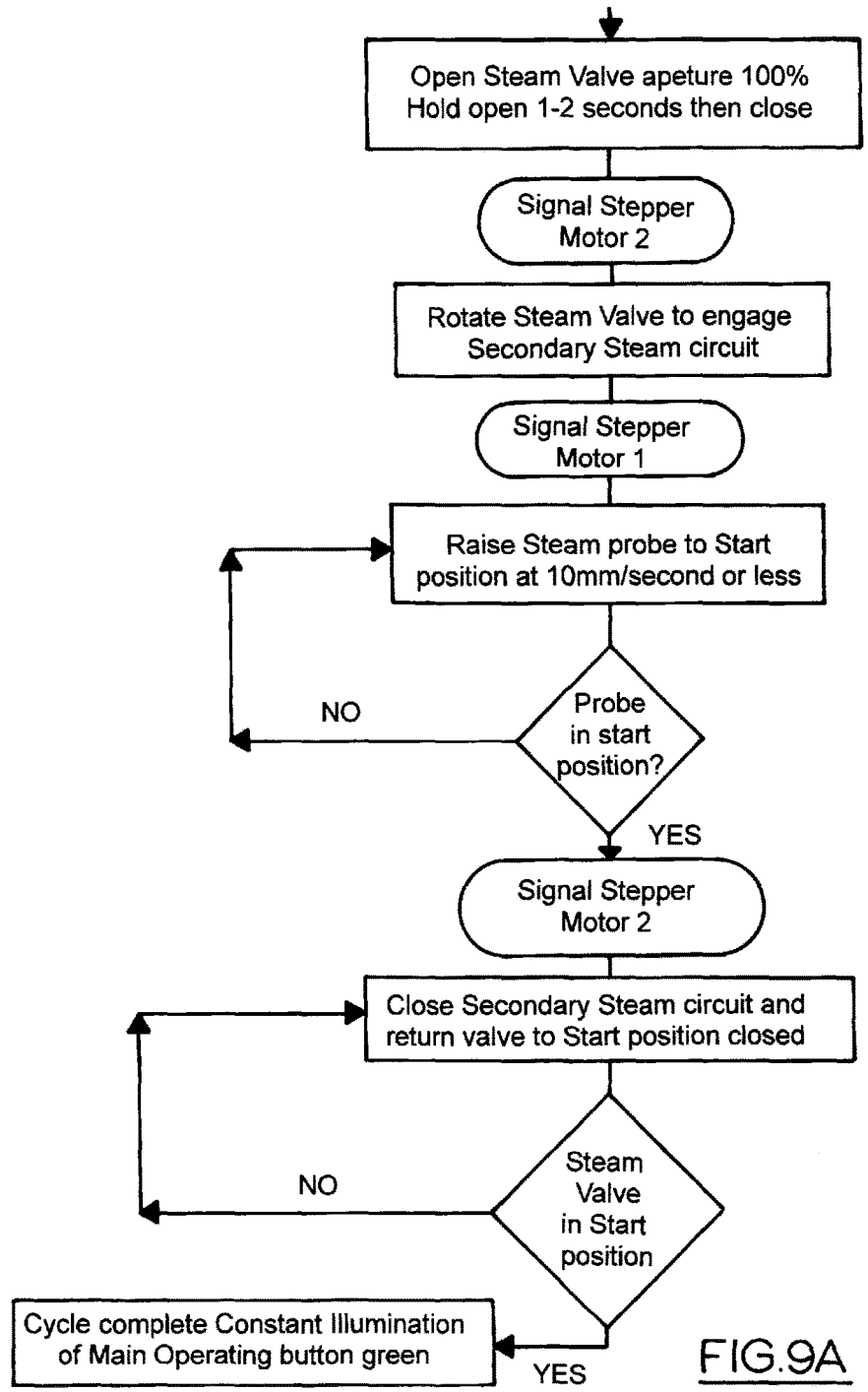
Figure 9B:
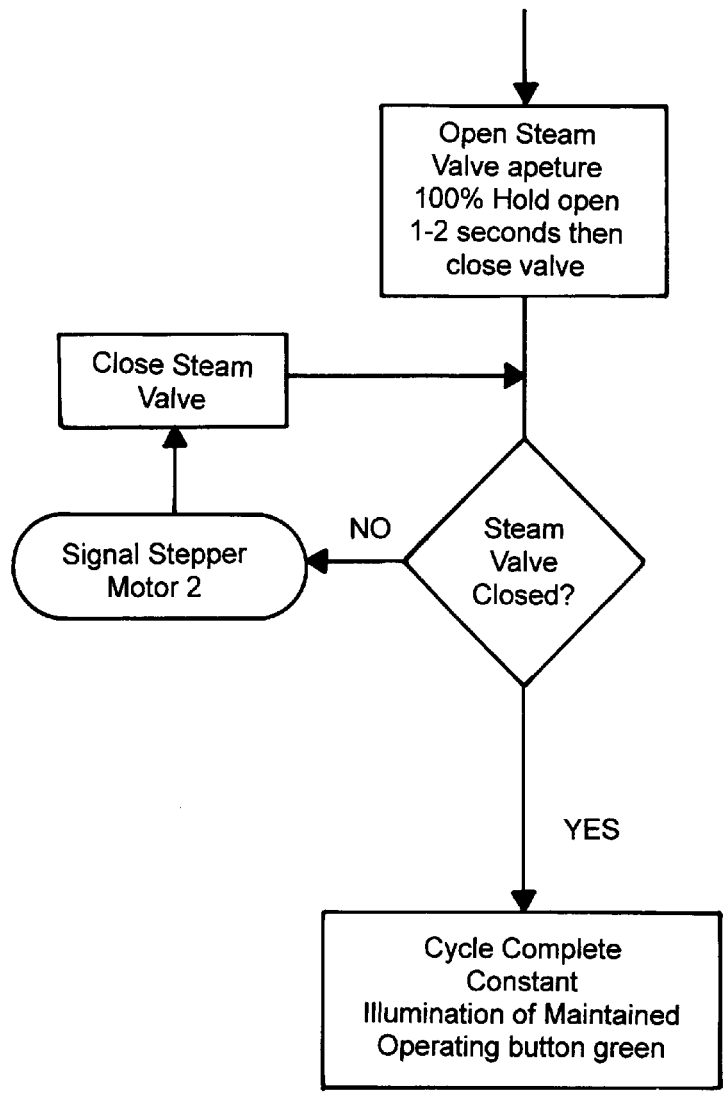

FIGS. 6 to 9 illustrates the logic of the normal operational mode in which the container size is selected and the operation button is depressed to start the cycle. There is an optional hot shot sequence. The level sensor determines the level of milk in the container and calculates if this is sufficient and displays the calculated volume on the display panel. The level sensor is either a non contact sensor or a contact sensor. With a contact sensor the stepper motor moves the jug platform or the sensor to achieve contact with the liquid surface. The milk temperature is sensed and displayed. The steam probe is then positioned appropriately below the milk surface either by moving the probe or the jug platform. The primary steam circuit (reference 1 in FIGS. 2 and 4) is then opened for a programmed period. The temperature and surface level is monitored as indicated in FIG. 8 and the probe position is adjusted to maintain the desired position. When the target temperature of the milk is achieved the steam circuit is closed and then the steam probe is raised or the jug platform lowered.

The secondary steam circuit (reference 2 in FIGS. 2 and 4) may then be actuated to clan the probe tip.

The frother of this invention may release pressure into atmosphere via a vent before the probe descends to the liquid surface start point: this relative position may be fixed or variable as determined by PLC program depending on variation caused by the type of milk being used, in order to take into account variations in the nature of frothing and style coffee style required.

The LED display during the cycle may be a segmented annulus which changes appearance in incremental blocks circumferentially as a means of displaying the count-down time before the machine will have completed its current cycle.

In the centre may be displayed the temperature of the Milk and the external jug surface temperature.

Milk volume displayed prior to heating/frothing cycle commencement is determined by the size of jug and depth sensor measurement.

The steam duration is a variable parameter depending upon the type of heat and froth profile required to be produced eg Flat-white needs little froth therefore lower tip, lower pressure (or longer time).

Maintenance programs may be Daily/weekly/monthly and include a Cleaning cycle. FIG. 10 illustrates a manual operation where the stepper motors may be manually controlled. This enables the main steam probe to be lowered incrementally to enable access to for cleaning the probe shaft and tip. In this manual mode the steam from both the primary steam circuit 1 and the secondary steam circuit 2 may be used to unblock the jet. The steam probe my be allowed to remain in its lowered position to enable it to be immersed in a cleaning solution. Machine power may be switched off in that position. If the machine is switched on the normal start up mode cycles all the motors and lights returning all valves and probes to the start position display the ready and auto signals.

Manual cleaning mode will involve placing jug of water or cleaning solution in the nest and manually lowering steam probe into jug and leave to soak.

Reset Mode raises wand to normal starting position and returns machine from manual to automatic mode.

A Cleaning Cycle may be automatic in some embodiments of the invention.

The steam valve may direct steam to a secondary channel or circuit. The secondary steam circuit is fixed and encircles the steam probe and tip. Using multiple steam jets formed by perforations in the internal circumference of the secondary steam circuit, blasts and washes off milk residue from the steam probe as it passes through the aperture when returning to the neutral or start position This cleaning cycle may be manually initiated or pre-programmed as part of the normal operating procedure of the machine with a cleaning cycle following each normal machine heating/frothing cycle Calibration of the machine will involve:
Height from probe tip to top of nest
Height from probe tip to internal base of jug
Temperature of boiling water in jug
Other possible programmable parameters include
Minimum volume of milk/liquid in jug.

At the start of day after switching machine on the machine does a fault calibration check including mechanical cycling of steam probe (ie lowering and raising probe)

Various lights will be switched on and off during this process

Machine will finally illuminate the main operating button with a green colour when all systems are "Go"

FIG. 11 illustrates the programming mode which enables the manipulation of machine settings, calibration and definition of all necessary parameters for optimum heating and frothing profiles. Data input and instructions may be made via the user interface screen, key pad or via a separate computer. The machines own data log capacity may be interrogated using the interface components.

From the above it can be seen that this invention provides a unique means of increasing barista productivity without losing the quality of milk frothing required for premium espresso coffee products. Those skilled in the art will realise that this invention may be implemented in embodiments other than those described without departing from the core teachings of this invention.

The invention claimed is:

1. A milk frothing apparatus which includes:
   a steam probe having a steam probe tip;
   a jug and jug support, wherein one of the steam probe and the jug support is configured to be movable relative to the other of the steam probe and the jug support;
   a resistance sensor, located adjacent to the steam probe tip, to determine a depth of milk in the jug;
   a temperature sensor to monitor the temperature of the milk in the jug;
   a micro controller programmed to:
     receive a required heated and frothed milk profile;
     start a milk frothing process forming a froth above a liquid surface of the milk by controlling steam volume, time, and temperature;
     maintain the steam probe tip and the resistance sensor at a required fixed depth with respect to the liquid surface of the milk in the jug using the depth determined by the resistance sensor, wherein the required fixed depth is predetermined by the required heated and frothed milk profile;
     stop the milk frothing process by withdrawing the steam probe tip at a required speed when the milk reaches a desired temperature, wherein the required speed of withdrawing is predetermined by the required heated and frothed milk profile; and
     maintain records of the number of cycles and a measure of the quantity of milk treated.

2. The milk frothing apparatus as claimed in claim 1 in which the steam probe is made of stainless steel and electrically isolated to act as the resistance sensor.

3. The milk frothing apparatus as claimed in claim 1 in which the temperature sensor is an infrared temperature sensor located above the jug to directly monitor the milk temperature.

4. The milk frothing apparatus as claimed in claim 1 in which a non-contact temperature sensor is located adjacent the jug to monitor an external jug surface temperature.

5. The milk frothing apparatus as claimed in claim 1 which also includes a user interface screen and electro-mechanical key pad and a user interface "touch" screen and virtual key pad.

6. The milk frothing apparatus as claimed in claim 1 which includes a secondary steam circuit for self-cleaning the steam probe, the secondary steam circuit is fixed and encircles the steam probe and tip forming a central aperture through which the steam probe and tip can pass and using multiple steam jets formed by perforations in the internal circumference of the secondary steam circuit allows for washing off milk residue as the steam probe and tip passes through the aperture.

7. A milk frothing apparatus as claimed in claim 6 wherein the secondary steam circuit is fixed and the steam probe and tip moves from an operative position through a cleaning position in which the secondary steam circuit encircles the steam probe and tip to a neutral or start position.

\* \* \* \* \*